(12) United States Patent
Hwang et al.

(10) Patent No.: US 10,514,209 B2
(45) Date of Patent: Dec. 24, 2019

(54) WATER-COOLING TYPE SECONDARY BATTERY

(71) Applicant: SK Innovation Co., Ltd., Seoul (KR)

(72) Inventors: Jae Il Hwang, Daejeon (KR); Dong Hun Lim, Goyang-si (KR)

(73) Assignee: SK Innovation Co., Ltd., Seoul (KR)

( * ) Notice: Subject to any disclaimer, the term of this patent is extended or adjusted under 35 U.S.C. 154(b) by 416 days.

(21) Appl. No.: 14/362,171

(22) PCT Filed: Nov. 29, 2012

(86) PCT No.: PCT/KR2012/010246
§ 371 (c)(1),
(2) Date: Jun. 2, 2014

(87) PCT Pub. No.: WO2013/081396
PCT Pub. Date: Jun. 6, 2013

(65) Prior Publication Data
US 2014/0335390 A1    Nov. 13, 2014

(30) Foreign Application Priority Data

Dec. 2, 2011 (KR) .......................... 10-2011-0128464

(51) Int. Cl.
*H01M 10/6567* (2014.01)
*F28F 1/00* (2006.01)
(Continued)

(52) U.S. Cl.
CPC .............. *F28F 1/00* (2013.01); *H01M 10/613* (2015.04); *H01M 10/6555* (2015.04);
(Continued)

(58) Field of Classification Search
CPC ............. F25D 17/02; F28D 2021/0029; F28D 2021/0043; F28F 1/00; H01M 10/0413;
(Continued)

(56) References Cited

U.S. PATENT DOCUMENTS 8,323,819 B2    12/2012    Lee et al.
9,077,058 B2    7/2015    Yang et al.
(Continued)

FOREIGN PATENT DOCUMENTS

JP      3426701 B2      7/2003
JP      20099889 A      1/2009
(Continued)

OTHER PUBLICATIONS

Yang et al., Cooling Member of Novel Structure and Battery Module Employed with the Same, Nov. 27, 2012, K-PION machine translation (Year: 2012).*

*Primary Examiner* — Adam A Arciero
(74) *Attorney, Agent, or Firm* — The Webb Law Firm

(57) ABSTRACT

Provided is a water-cooling type secondary battery, and more particularly, a water-cooling type secondary battery capable of improving heat conductivity to thereby increase cooling efficiency by integrally forming a refrigerant pipe on an edge part of heat radiating plates respectively interposed between a plurality of battery cells which are stacked in parallel with each other and closely adhered to each other.

6 Claims, 5 Drawing Sheets

(51) Int. Cl.
*H01M 10/6555* (2014.01)
*H01M 10/613* (2014.01)
*H01M 10/6557* (2014.01)
*H01M 10/647* (2014.01)
*H01M 10/04* (2006.01)
*F28D 21/00* (2006.01)

(52) U.S. Cl.
CPC ... *H01M 10/6557* (2015.04); *H01M 10/6567* (2015.04); *F28D 2021/0029* (2013.01); *F28D 2021/0043* (2013.01); *H01M 10/0413* (2013.01); *H01M 10/0436* (2013.01); *H01M 10/647* (2015.04); *H01M 2220/00* (2013.01)

(58) Field of Classification Search
CPC ......... H01M 10/0436; H01M 10/5075; H01M 10/60; H01M 10/613; H01M 10/647; H01M 10/6555; H01M 10/6557; H01M 10/6567; H01M 2220/00; H01M 2/10
See application file for complete search history.

(56) References Cited

U.S. PATENT DOCUMENTS

2012/0107664 A1* 5/2012 Lee .................. H01M 2/1077
429/120
2013/0045410 A1* 2/2013 Yang ................ H01M 10/625
429/120

FOREIGN PATENT DOCUMENTS

| KR | 1020100119499 A | 11/2010 | |
|---|---|---|---|
| KR | 1020110126764 A | 11/2011 | |
| KR | 1020110126765 A | 11/2011 | |
| WO | 2011013905 A2 | 2/2011 | |
| WO | 2011145830 A2 | 11/2011 | |
| WO | WO-2011145830 A2 * | 11/2011 | .......... H01M 10/625 |

* cited by examiner

WATER-COOLING TYPE SECONDARY BATTERY

CROSS-REFERENCE TO RELATED APPLICATIONS

This application is the United States national phase of International Application No. PCT/KR2012/010246 filed Nov. 29, 2012, and claims priority to Korean Patent Application No. 10-2011-0128464 filed Dec. 2, 2011, the disclosures of which are hereby incorporated in their entirety by reference.

TECHNICAL FIELD

The present invention relates to a water-cooling type secondary battery, and more particularly, to a water-cooling type secondary battery capable of improving heat conductivity to thereby increase cooling efficiency by integrally forming a refrigerant pipe on an edge part of heat radiating plates respectively interposed between a plurality of battery cells which are stacked in parallel with each other and closely adhered to each other.

BACKGROUND ART

In general, in order to cool heat generated upon charging or discharging a battery pack, the battery pack has a structure in which heat conductive plates are respectively interposed between a plurality of battery cells and are closely adhered to each other, and one side of the heat conductive plate is coupled to a cooling tube.

In addition, heat exchanging medium such as air, cooling water, or the like passes through the cooling tube and absorbs heat transferred from the heat conductive plate, such that the battery cells are cooled.

However, since the heat conductive plate and the cooling tube are made of an aluminum (Al) material or a copper (Cu) material having high heat conductivity to cool the batter cells, it is difficult to couple the heat conductive plate and the cooling tube to each other.

That is, in order to bond the heat conductive plate and the cooling tube made of a metal material, the heat conductive plate and the cooling tube may be coupled by a welding or a structure in which a coupling groove 31 is formed in the cooling tube 30 and one side of the heat conductive plate 20 is bent to insert a bending part 21 into the coupling groove 31 as shown in FIG. 1.

However, since this solution has a complex structure for coupling the heat conductive plate 20 and the cooling tube 30 to each other, manufacturing cost may be increased. In addition, since it is difficult to completely adhere surfaces to which the heat conductive plate 20 and the cooling tube 30 are coupled to each other and in contact with each other, heat conductivity is decreased, thereby degrading cooling efficiency.

RELATED ART DOCUMENT

Patent Document

FIGS. 3, 11, and 12 in KR 10-2010-0119499 A (Nov. 9, 2010)

DISCLOSURE

Technical Problem

An object of the present invention is to provide a water-cooling type secondary battery capable of improving heat conductivity to thereby increase cooling efficiency by integrally forming a refrigerant pipe on an edge part of heat radiating plates respectively interposed between a plurality of battery cells which are stacked in parallel with each other and closely adhered to each other.

Technical Solution

In one general aspect, a water-cooling type secondary battery includes: a plurality of battery cells spaced apart from each other by a predetermined distance and formed in parallel with each other; and heat radiating plates respectively interposed between the battery cells and closely adhered to each other, and formed to be wider than an electrode body of the battery cell, wherein the heat radiating plate has a refrigerant pipe integrally formed on an edge thereof, such that the refrigerant pipe is disposed at an outer side of the electrode body.

In another general aspect, a water-cooling type secondary battery includes: a sub-module formed by interposing a heat radiating plate between a pair of battery cells and closely adhering the heat radiating plate and the battery cells to each other, the sub-module is stacked in plural, wherein the heat radiating plate is formed to be wider than an electrode body of the battery cell and has a refrigerant pipe integrally formed on an edge thereof, such that the refrigerant pipe is disposed at an outer side of the electrode body.

The water-cooling type secondary battery may further include an inlet manifold connected to inlets of the refrigerant pipes and having an inlet pipe formed on one side thereof and an outlet manifold connected to outlets of the refrigerant pipes and having an outlet pipe formed on one side thereof.

Advantageous Effects

Since the water-cooling type secondary battery according to the present invention has the refrigerant pipe integrally formed on the edge part of the heat radiating plates respectively interposed between the plurality of battery cells which are stacked in parallel with each other and closely adhered to each other, the heat conductivity of the portions in which the heat radiating plates and the refrigerant pipes are in contact with each other is improved, thereby making it possible to increase the cooling efficiency.

DESCRIPTION OF DRAWINGS

The above and other objects, features and advantages of the present invention will become apparent from the following description of preferred embodiments given in conjunction with the accompanying drawings, in which.

| [Detailed Description of Main Elements] | |
|---|---|
| 1000: water-cooling type secondary battery according to present invention | |
| 100: battery cell | |
| 110: electrode body | 120: electrode tab |
| 200: heat radiating plate | |
| 210: refrigerant pipe | |
| 211: inlet | 212: outlet |
| 300: inlet manifold | 310: inlet pipe |
| 400: outlet manifold | 410: outlet pipe |
| 500: sub-module | |

BEST MODE

Hereinafter, a water-cooling secondary battery according to the present invention as described above will be described in detail with reference to the accompanying drawings.

Figure 1:
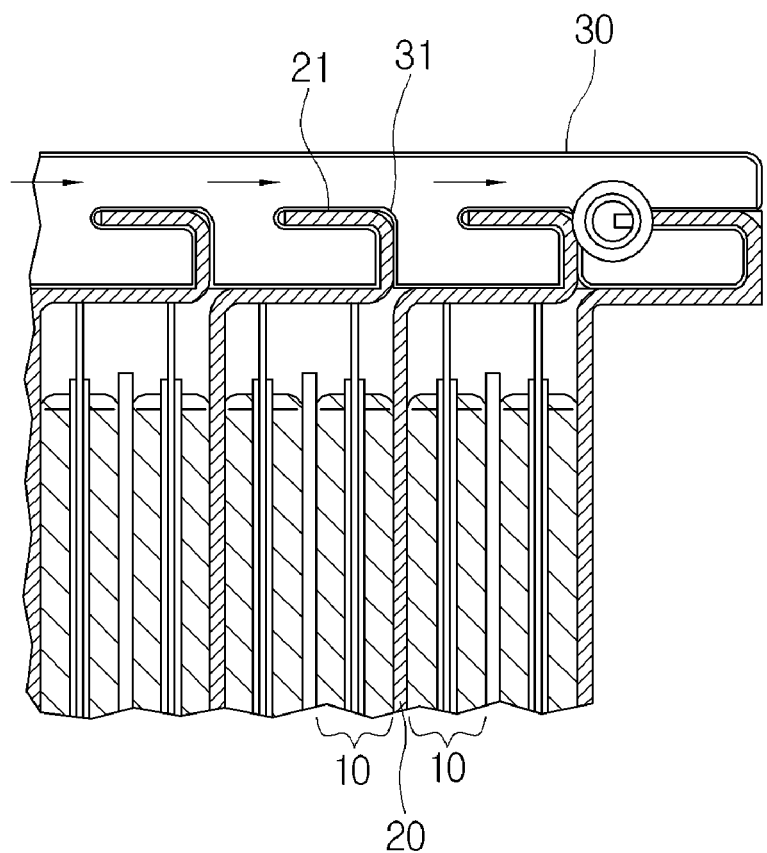
FIG. 1 is a schematic view showing a cooling structure of a battery pack according to the related art.
Figure 2:
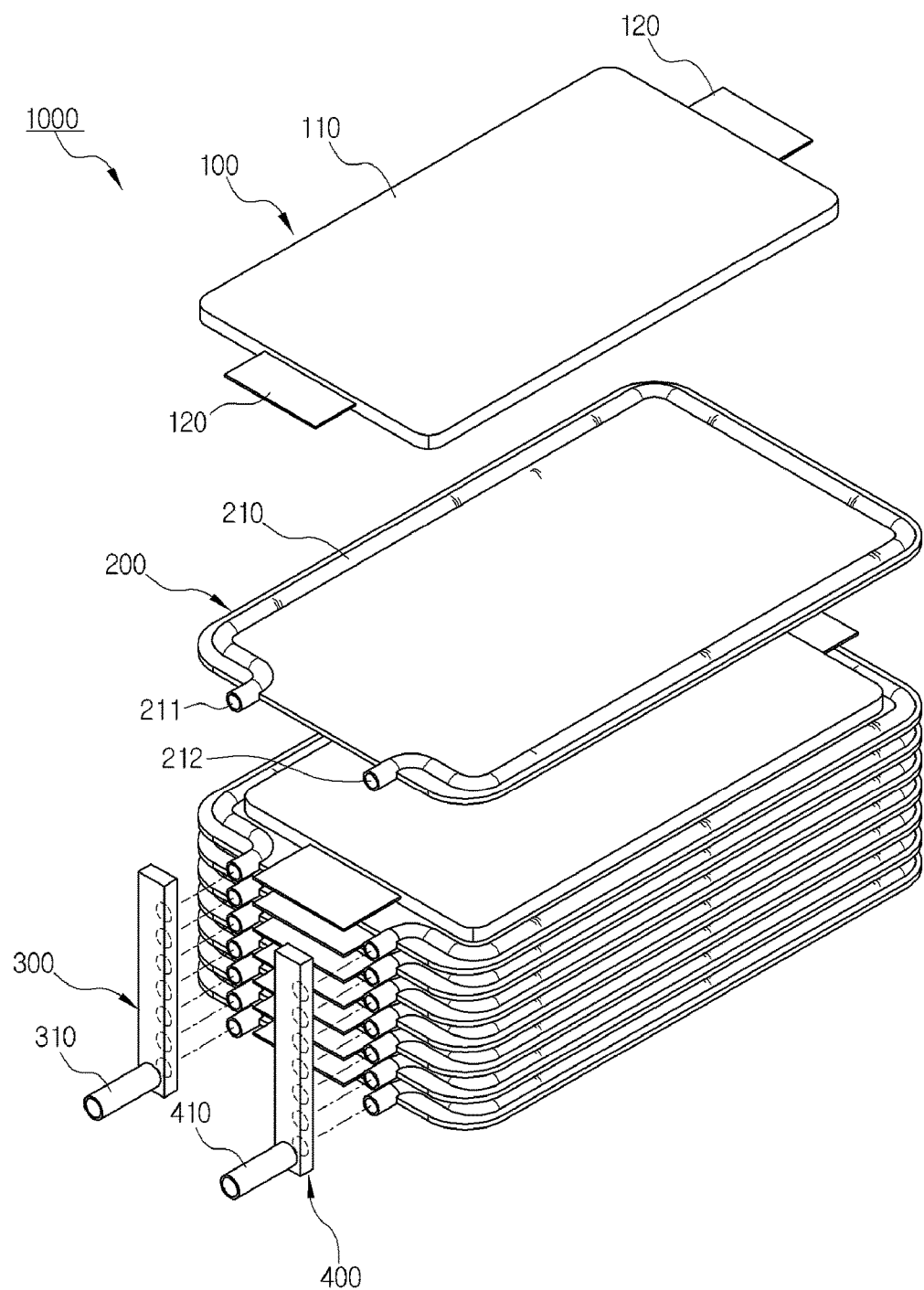
FIGS. 2 and 3 are an exploded perspective view and an assembly perspective view showing a water-cooling type secondary battery according to the present invention.
Figure 3:
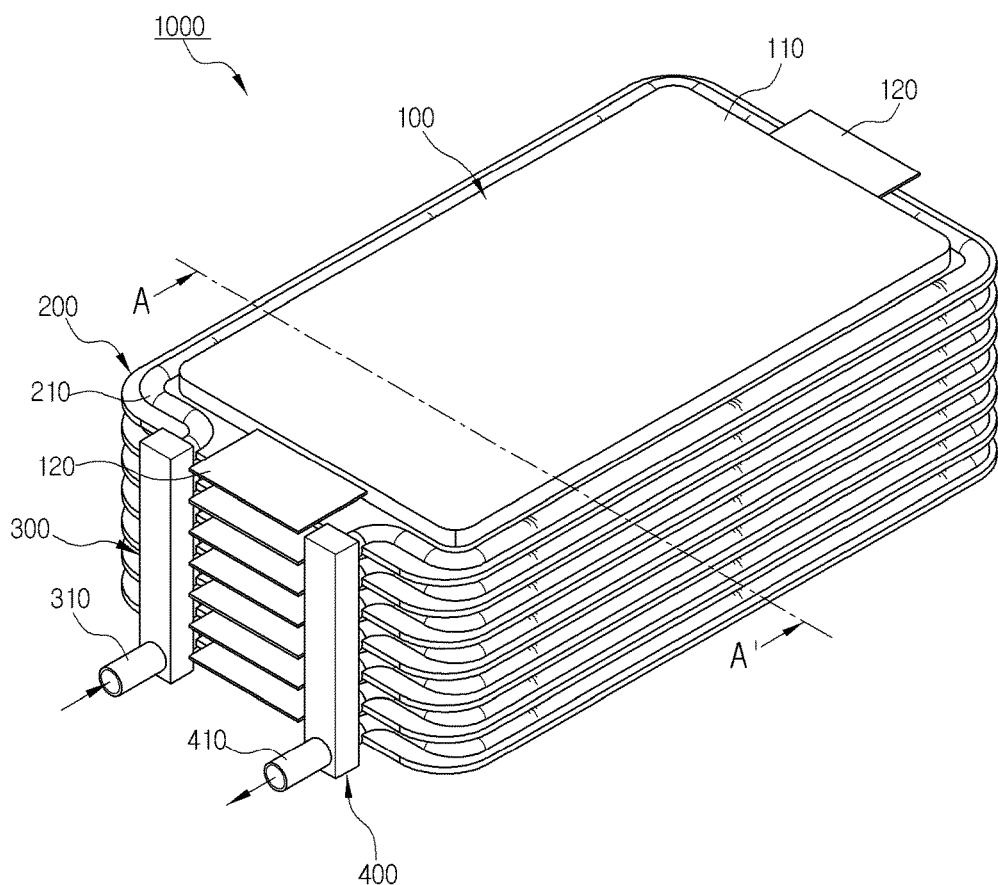

FIGS. 2 and 3 are an exploded perspective view and an assembly perspective view showing a water-cooling type secondary battery according to the present invention.

As shown, a water-cooling type secondary battery 1000 according to the present invention includes a plurality battery cells 100 spaced apart from each other by a predetermined distance and formed in parallel with each other; and heat radiating plates 200 respectively interposed between the battery cells 100 and closely adhered to each other, and formed to be wider than an electrode body 110 of the battery cell 100, wherein the heat radiating plate 200 has a refrigerant pipe 210 integrally formed on an edge thereof and is formed so that the refrigerant pipe 210 is disposed at an outer side of the electrode body 110.

First, the battery cells 100 are formed in parallel with each other to be spaced apart from each other by a predetermined distance, wherein the battery cell 100 has electrode tabs 120 formed at one side or both sides of the electrode body 110 formed in a plate shape, and the electrode tabs 120 of the battery cells 100 are electrically connected in series or in parallel with electrode tabs 120 of the battery cells 100 neighboring to each other.

The heat radiating plates 200 formed in a plate shape are respectively interposed between the battery cells 100 and then closely adhered to each other, such that they are configured to allow heat generated during a process of charging or discharging the battery cells 100 to be quickly transferred to the heat radiating plates 200.

In addition, the heat radiating plate 200 may be made of a material having high heat conductivity such as aluminum or copper, and is preferably made of a material capable of quickly transferring the heat generated from the battery cell 100 thereto.

In this case, the heat radiating plate 200 is formed to be wider than the electrode body 110 of the battery cell 100.

In addition, the heat radiating plate 200 has a refrigerant pipe 210 integrally formed on an edge thereof, such that the refrigerant pipe 210 is disposed at the outer side of the battery cell 100.

Figure 4:
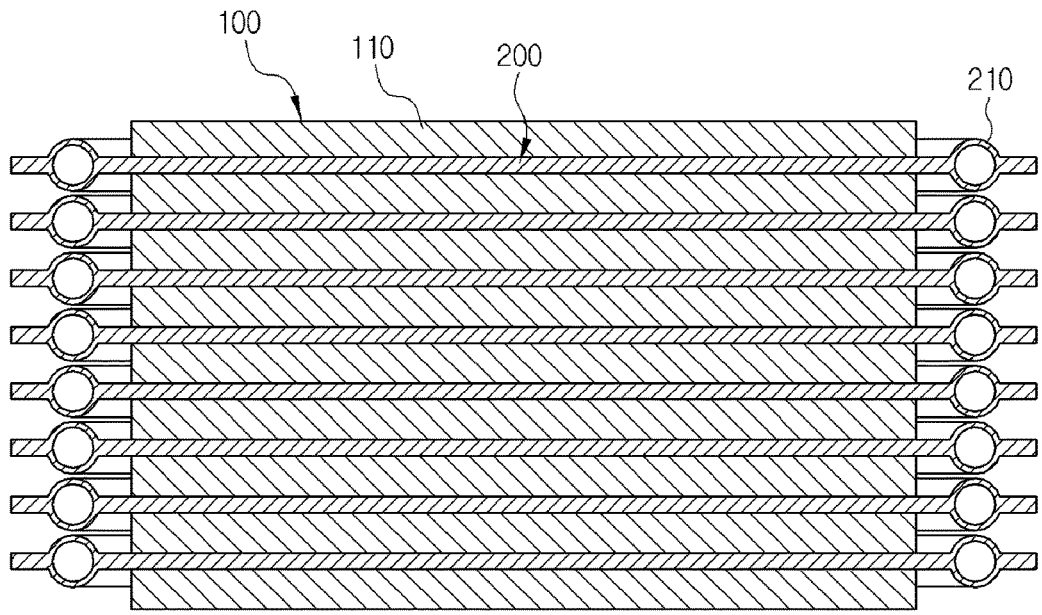
FIG. 4 is a cross-sectional view taken along a direction A-A' of FIG. 3.

As such, the refrigerant pipe 210 formed on the edge of the heat radiating plate 200 is formed in a form enclosing the outer side of the electrode body 110 of the battery cell 100 as shown in FIGS. 3 and 4.

In addition, the refrigerant pipe 210 has an inlet 211 and an outlet 212 respectively formed therein, such that a refrigerant may pass through the refrigerant pipe 210 and perform heat exchanging. Although FIGS. 2 and 3 show a form in which the inlet 211 and the outlet 212 are configured at one side of the heat radiating plate 200, the formation of the inlet 211 and the outlet 212 may be variously changed depending on a shape of the battery cell 100 and a position at which the electrode tabs 120 are formed.

As a result, the heat generated from the electrode body 110 upon charging or discharging the battery cells 100 is transferred to the refrigerant pipe 210 through the heat radiating plate 200 and transferred to the refrigerant passing through an inside of the refrigerant pipe 210, thereby cooling the battery cell 100.

In this case, since the refrigerant pipe 210 is integrally formed on the heat radiating plate 200, cooling efficiency of the battery cell 100 is increased.

That is, in the case in which the heat radiating plate 200 and the refrigerant pipe 210 are separately formed and they are then assembled and coupled to each other, since a contact is not perfectly made at the coupled portion, heat conductivity is degraded, and in the case in which they are coupled to each other by a welding, since it is difficult to weld the heat radiating plate 200 and the refrigerant pipe 210 to be perfectly in contact with each other and deformation of the heat radiating plate 200 is caused by the welding, it is unlikely to perfectly adhere the heat radiating plate 200 to battery cell 100. Therefore, since the heat radiating plate 200 and the refrigerant pipe 210 according to the present invention are integrally formed to thereby improve heat conductivity, the cooling efficiency is increased.

In addition, as another example of a water-cooling type secondary battery 1000 according to the present invention, the water-cooling type secondary battery 1000 includes a sub-module 500 formed by interposing the heat radiating plate 200 between a pair of battery cells 100 and closely adhering the heat radiating plate 200 and the battery cells 100 to each other, the sub-module 500 being stacked in plural, wherein the heat radiating plate 200 is formed to be wider than the electrode body 110 of the battery cell 100 and has the refrigerant pipe 210 integrally formed on the edge thereof, such that the refrigerant pipe 210 may be disposed at an outer side of the electrode body 110.

Similar to the above-mentioned embodiment, this has the same configuration as the above-mentioned embodiment that the heat radiating plate 200 is formed to be wider than the electrode body 110 of the battery cell 100 and the refrigerant pipe 210 is formed on the edge of the heat radiating plate 200, but has a configuration that one heat radiating plate 200 per two battery cells 100 is interposed between the battery cells 100 and adhered to each other.

Figure 5:
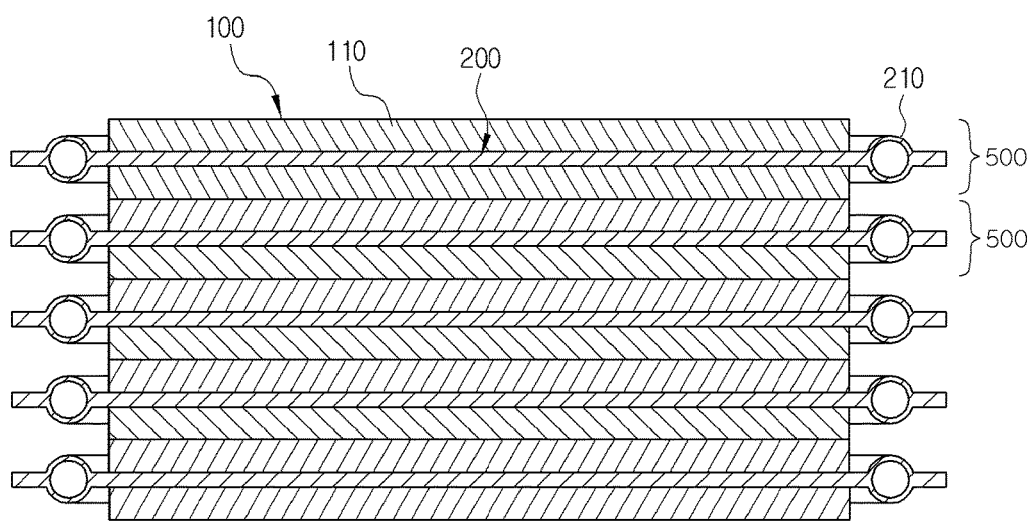
FIG. 5 is a cross-sectional view taken along the direction A-A' showing a water-cooling type secondary battery according to another embodiment of the present invention.
Figure 6:
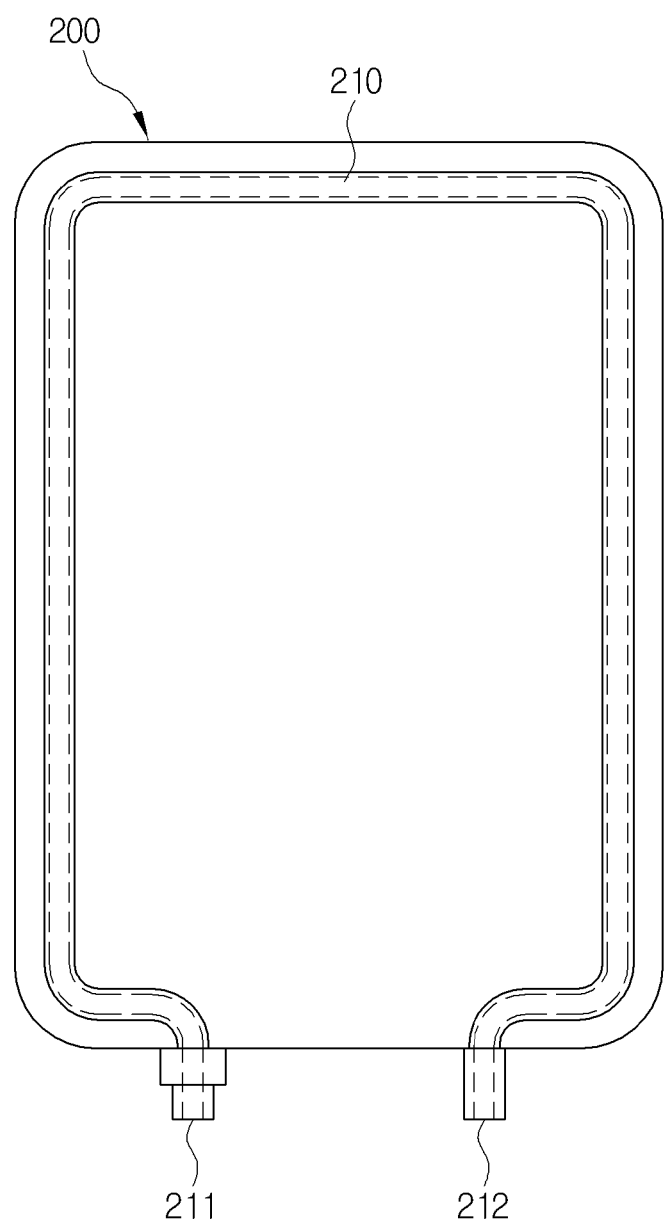
FIG. 6 is a plan view showing a heat radiating plate according to the present invention.

That is, as shown in FIG. 5, the secondary battery 1000 is configured in a form in which the heat radiating plate 200 is alternately interposed between the stacked battery cells 100.

As a result, since one secondary battery 1000 may be configured by stacking the plurality of sub-modules 500 including the heat radiating plate 200, it is possible to conveniently assemble. In addition, in configuring the sub-module 500, a diameter of the refrigerant pipe 210 formed on the edge of the heat radiating plate 200 may be formed to be greater than that of the former embodiment, the cooling efficiency may be increased.

In addition, the secondary battery 1000 formed to be stacked as described in the former and latter embodiments may further include an inlet manifold 300 connected to the inlets 211 of the refrigerant pipes 210 and having an inlet pipe 310 formed on one side thereof and an outlet manifold 400 connected to the outlets 212 of the refrigerant pipes 210 and having an outlet pipe 410 formed on one side thereof.

This has a configuration in which the plurality of heat radiating plates 200 are stacked and the inlets 211 and the outlets 212 of the refrigerant pipes 210 are formed on one side in parallel with each other, such that the inlets 211 are lengthily coupled to the inlet manifold 300 to be in communication with each other and the outlets 212 are lengthily coupled to the outlet manifold 400 to be in communication with each other.

As a result, since the refrigerant introduced through the inlet pipe 310 flows along the inlet manifold 300, is introduced the respective inlets 211, passes through the plurality of refrigerant pipes 210, performs the heat exchanging, is discharged to the respective outlets 212, is collected in the outlet manifold 400, and is then discharged through the outlet pipe 410, the plurality of battery cells 100 may be uniformly cooled.

In this case, the inlet 211 and the outlet 212 may be configured to be connected to a heat exchanger which is separately configured by a hose or a pipe, cool the refrigerant by passing the refrigerant heated during the circulation in the refrigerant pipe 210 through the heat exchanger, and then allow the cooled refrigerant to be again introduced into the refrigerant pipe 210.

In addition, as the refrigerant, water may be used, and a separation refrigerant having high heat exchanging efficiency may be used according to characteristics and uses of the battery.

As a method for integrally forming the refrigerant pipe 210 on the edge of the heat radiating plate 200, a metal plate having a clad layer formed on one surface thereof is press-machined to form a groove in an edge, two plates formed as described above are coupled to face each other and are then brazed, the clad layer is melted and welded, and the grooves facing each other are formed as the refrigerant pipe, such that the heat radiating plate integrally formed with the refrigerant pipe may be manufactured.

In addition, the metal plate is press-machined to form the groove in the edge, and the refrigerant pipe having the clad layer formed at the outer side to correspond to a shape of the groove is manufactured to be inserted into the groove and then be brazed, such that the refrigerant pipe and the metal plate may be integrally formed.

The present invention is not limited to the above-mentioned embodiments but may be variously applied, and may be variously modified by those skilled in the art to which the present invention pertains without departing from the gist of the present invention claimed in the claims.

The invention claimed is:

1. A water-cooling type secondary battery comprising:
a plurality of battery cells spaced apart from each other by a predetermined distance and formed in parallel with each other; and
heat radiating plates respectively interposed between the battery cells and closely adhered to each other, and formed to be wider than an electrode body of the battery cell,
wherein at least one of the heat radiating plates is formed by bonding an upper heat radiating plate to a lower heat radiating plate, each of the upper and lower heat radiating plates being made of metal,
wherein the upper heat radiating plate has an integral groove formed at a peripheral edge thereof and the lower heat radiating plate has an integral groove formed at a peripheral edge thereof, the groove of the lower heat radiating plate corresponding to the groove of the upper heat radiating plate,
wherein the groove of the upper heat radiating plate and the groove of the lower heat radiating plate are engaged and secured together to define a refrigerant pipe in which a refrigerant flows, the refrigerant pipe being formed integrally on a peripheral edge of the at least one heat radiating plate, and
wherein the heat radiating plate has portions in which the upper heat radiating plate and the lower heat radiating plate are overlapped and abutted against each other on opposite sides of the refrigerant pipe based on the refrigerant pipe.

2. A water-cooling type secondary battery comprising:
a sub-module formed by interposing a heat radiating plate between a pair of battery cells and closely adhering the heat radiating plate and the battery cells to each other, the sub-module being stacked in plural,
wherein the heat radiating plate is formed to be wider than an electrode body of the battery cell and has a refrigerant pipe integrally formed on an edge thereof, such that the refrigerant pipe encloses an outer side of the electrode body of the battery cell,
wherein at least one of the heat radiating plates is formed by bonding an upper heat radiating plate to a lower heat radiating plate, each of the upper and lower heat radiating plates being made of metal,
wherein the upper heat radiating plate has an integral groove formed at a peripheral edge thereof and the lower heat radiating plate has an integral groove formed at a peripheral edge thereof, the groove of the lower heat radiating plate corresponding to the groove of the upper heat radiating plate,
wherein the groove of the upper heat radiating plate and the groove of the lower heat radiating plate are engaged and secured together to define a refrigerant pipe in which a refrigerant flows, the refrigerant pipe being formed integrally on a peripheral edge of the heat radiating plate, and
wherein the heat radiating plate has portions in which the upper heat radiating plate and the lower heat radiating plate are overlapped and abutted against each other on opposite sides of the refrigerant pipe based on the refrigerant pipe.

3. The water-cooling type secondary battery of claim 1, further comprising an inlet manifold connected to inlets of the refrigerant pipes and having an inlet pipe formed on one side thereof and an outlet manifold connected to outlets of the refrigerant pipes and having an outlet pipe formed on one side thereof.

4. The water-cooling type secondary battery of claim 2, further comprising an inlet manifold connected to inlets of the refrigerant pipes and having an inlet pipe formed on one side thereof and an outlet manifold connected to outlets of the refrigerant pipes and having an outlet pipe formed on one side thereof.

5. The water-cooling type secondary battery of claim 1, wherein the refrigerant pipe is formed in a form enclosing at least three outer sides of the electrode body of the battery cell.

6. The water-cooling type secondary battery of claim 1, wherein the inlet and the outlet of the refrigerant pipe are configured at one side of the heat radiating plate.

* * * * *